(12) United States Patent
Kremser et al.

(10) Patent No.: US 11,906,087 B2
(45) Date of Patent: Feb. 20, 2024

(54) FLANGED JOINT AND METHOD OF FLUIDLY CONNECTING TWO COMPONENTS

(71) Applicant: Applied Materials, Inc., Santa Clara, CA (US)

(72) Inventors: Lukas Kremser, Freigericht (DE); Andreas Sauer, Großostheim (DE); Stefan Bangert, Steinau (DE)

(73) Assignee: Applied Materials, Inc., Santa Clara, CA (US)

(*) Notice: Subject to any disclaimer, the term of this patent is extended or adjusted under 35 U.S.C. 154(b) by 343 days.

(21) Appl. No.: 17/025,268

(22) Filed: Sep. 18, 2020

(65) Prior Publication Data

US 2022/0090713 A1 Mar. 24, 2022

(51) Int. Cl.
*F16L 23/20* (2006.01)
*F16L 23/036* (2006.01)
*F16L 23/032* (2006.01)

(52) U.S. Cl.
CPC ............. *F16L 23/20* (2013.01); *F16L 23/032* (2013.01); *F16L 23/036* (2013.01)

(58) Field of Classification Search
CPC ....................................................... F16L 23/20
USPC .................................................. 277/645–646
See application file for complete search history.

(56) References Cited

U.S. PATENT DOCUMENTS

| | | | | |
|---|---|---|---|---|
| 2,291,709 A | * | 8/1942 | Goetze | F16L 23/20 |
| | | | | 285/368 |
| 3,118,693 A | * | 1/1964 | Wallace | F16L 27/1012 |
| | | | | 285/368 |
| 3,531,133 A | * | 9/1970 | Gulick | F16L 23/18 |
| | | | | 277/614 |
| 3,794,361 A | * | 2/1974 | Westberg | F16L 23/08 |
| | | | | 285/336 |
| 4,155,571 A | | 5/1979 | Gastineau et al. | |
| 4,189,158 A | | 2/1980 | Roussin | |
| 4,616,860 A | | 10/1986 | Faria et al. | |
| 7,540,502 B1 | * | 6/2009 | Moore | F16L 23/20 |
| | | | | 277/606 |
| 8,152,172 B2 | * | 4/2012 | Halling | F16J 15/0887 |
| | | | | 277/644 |
| 8,485,534 B2 | * | 7/2013 | Ohmi | F16J 15/0887 |
| | | | | 285/368 |
| 2017/0370470 A1 | * | 12/2017 | Chusak | F16J 15/104 |

FOREIGN PATENT DOCUMENTS

| | | |
|---|---|---|
| CN | 103644407 A | 3/2014 |
| CN | 107504195 A | 12/2017 |

OTHER PUBLICATIONS

International Search Report and Written Opinion, PCT/US2021/049304, dated Dec. 20, 2021.

* cited by examiner

*Primary Examiner* — Kevin F Murphy
(74) *Attorney, Agent, or Firm* — Patterson + Sheridan, LLP (57) ABSTRACT

A flanged joint is described. The flanged joint has a first flange member with a first sealing surface and a second flange member with a second sealing surface. The flanged joint further has a hollow-metal gasket between the first flange member and the second flange member, and a spacer between the first flange member and the second flange member. The spacer defines a minimum distance between the first flange member and the second flange member. The flanged joint can be configured to seal a metal-conveying volume.

17 Claims, 3 Drawing Sheets

FLANGED JOINT AND METHOD OF FLUIDLY CONNECTING TWO COMPONENTS

FIELD

Embodiments of the present disclosure relate to a flanged joint, particularly a flanged joint for joining lithium conveying components and sealing a lithium-conveying volume. Embodiments of the present disclosure further relate to a method for fluidly connecting two components, particularly two lithium-conveying volumes.

BACKGROUND

The demand for the efficient storage and transport of energy, e.g. for use in mobile devices, electric vehicles or related products, has led to the increased use of lithium-based energy storage devices, such as rechargeable lithium-ion batteries. Any development that improves the characteristics of such devices, such as higher energy density, lifespan, capacity, or reduced cost, weight or recharge time is generally advantageous.

Recent advances have led to the use of metallic lithium during the manufacture or processing of some lithium-containing devices, which can also be beneficial in improving the above-mentioned characteristics of lithium-based energy storage devices. Such processes can, for example, include the deposition of gaseous metallic lithium onto a substrate under vacuum. Before the lithium is vaporized, the lithium is typically handled in the liquid state.

The safe and efficient handling of metallic lithium is challenging. It is known that lithium is highly reactive and therefore precludes the use of certain materials and/or structures in such processing systems. Furthermore, lithium processing often subjects the relevant components of a processing apparatus to a wide range of temperatures, often spanning several hundred degrees centigrade, which can put high thermal, mechanical and chemical stresses on the structures intended for sealing liquid or gaseous lithium within a defined volume. Particular problems can arise when joining lithium-conveying components.

Accordingly, there is a need for a joined arrangement suitable for the efficient sealing of lithium metal in the liquid or gaseous state under the conditions present within a lithium processing apparatus.

SUMMARY

According to an aspect, a flanged joint is described. The flanged joint has a first flange member with a first sealing surface and a second flange member with a second sealing surface. The flanged joint further has a hollow-metal gasket between the first flange member and the second flange member, and a spacer between the first flange member and the second flange member. The spacer defines a minimum distance between the first flange member and the second flange member.

According to an aspect, a method of fluidly connecting a first component to a second component is described. The method includes connecting a first flange member having a first sealing surface to the first component, and connecting a second flange member having a second sealing surface to the second component. The method further includes arranging a hollow-metal gasket between the first flange member and the second flange member, and arranging a spacer between the first flange member and the second flange member. The method further includes connecting the first flange member to the second flange member. The hollow-metal gasket forms a seal between the first sealing surface and the second sealing surface, and the spacer defines a minimum distance between the first flange member and the second flange member.

BRIEF DESCRIPTION OF THE DRAWINGS

So that the manner in which the above recited features of the present disclosure can be understood in detail, a more particular description of the disclosure, briefly summarized above, may be had by reference to embodiments. The accompanying drawings relate to embodiments of the disclosure and are described in the following.

DETAILED DESCRIPTION OF EMBODIMENTS

Reference will now be made in detail to the various embodiments, one or more examples of which are illustrated in each figure. Each example is provided by way of explanation and is not meant as a limitation. For example, features illustrated or described as part of one embodiment can be used on or in conjunction with any other embodiment to yield yet a further embodiment. It is intended that the present disclosure includes such modifications and variations. Within the following description of the drawings, the same reference numbers refer to the same or to similar components. Generally, only the differences with respect to the individual embodiments are described. Unless specified otherwise, the description of a part or aspect in one embodiment can apply to a corresponding part or aspect in another embodiment as well.

According to some embodiments of the present disclosure, a flanged joint can be provided. The flanged joint can be a joint for joining two lithium-carrying or lithium-conveying components, e.g. pipes. The components can comprise volumes, such that the components, when connected by the flanged joint, can form a lithium-conveying interior volume. The lithium-conveying volumes can be provided within a lithium-processing apparatus, such as a lithium deposition apparatus. The lithium-conveying volumes can hold or convey the lithium that is processed within the lithium-processing apparatus. The lithium-conveying volumes can be used to receive, hold or transport lithium, e.g. solid or liquid lithium. The lithium-conveying volumes can be used to transport liquid or gaseous lithium. The lithium-conveying volumes can be part of a crucible used for evaporating lithium, wherein the flanged joint joins a crucible to a chamber. The conveyed lithium can be liquid or gaseous, which, according to the known phase diagram of lithium, can involve a wide range of pressures, such as medium to high pressure, such as 1 to 2 bar, normal pressure, such as atmospheric pressure, or vacuum, such as $10^{-3}$ mbar, and temperatures in the range of room temperature up to several hundred degrees centigrade, such as 600° C. Additionally, when the apparatus comprising the joint is not in use, a cooling-down of the joint to room temperature is to be expected.

According to embodiments of the present disclosure, a flanged joint provides a sealed connection between the two volumes, such that no leakage of lithium occurs under the processing conditions the joint is subjected to. According to embodiments, the use of a flanged joint has the benefit that the joint is a non-permanent joint, so that the flanged joint allows reversibly joining or disjoining components, which is not possible with, e.g., traditional welds. Furthermore, the flanged joint can be chemically inert such that no significant degradation of the materials within the joint occurs for an adequately long period.

While the present disclosure refers, in some aspects, to the processing of lithium, the claimed subject-matter can be equally beneficial for other reactive metals, such as alkaline or alkaline earth metals.

Figure 1:
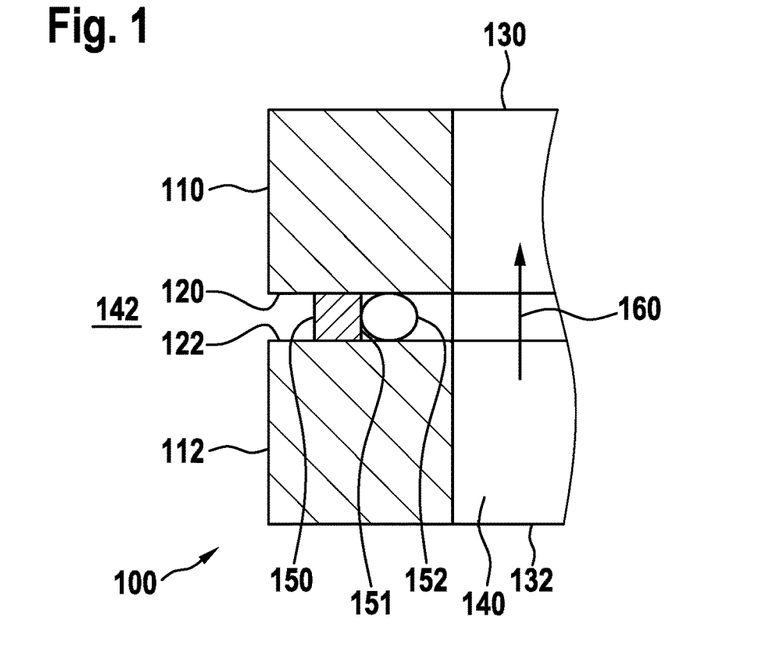
FIG. 1 shows a schematic cross-section of a flanged joint according to embodiments of the present disclosure.

Referring to FIG. 1, a flanged joint 100 according to embodiments described herein is shown schematically in a side view. In the configuration shown in FIG. 1, the flanged joint is configured to join two components (not shown) and seals the interior volume 140 against the exterior volume 142. For brevity, the configuration of FIG. 1 shall be referred to as "sealed". Only one relevant section of the flange is illustrated. The flange 100 can surround the interior volume 140 to provide a seal to the exterior volume 142. The flanged joint 100 can be rotationally symmetrical, i.e. circular, or the flanged joint 100 can be based on a different shape, such as, e.g. an ellipse, a rounded diamond or rectangle.

According to embodiments, which can be combined with other embodiments described herein, the flanged joint 100 comprises two flange members 110, 112, which can have a similar, i.e. mirrored, or an identical shape. The flange members can define the overall shape of the flanged joint. The flange members can be flange plates. The flange members can be disc-shaped, i.e. have a circular base-shape, or can have another suitable base-shape, such as an oval, a rounded diamond or rectangle. The flange members 110, 112 comprise two sealing surfaces 120, 122. The sealing surfaces can be arranged opposite each other, particularly parallel to each other, such that they both contact a hollow-metal gasket 152 and a spacer 150 when the flange is sealed.

In an embodiment, which can be combined with other embodiments, the sealing surfaces 120, 122 can be flat sealing surfaces. The sealing surfaces 120, 122 are considered flat sealing surfaces when the portion of the surface that is in contact with the hollow-metal gasket 152 and the spacer 150 is flat. It can be beneficial if the whole face of the sealing surface is flat. Flat, in the context of this disclosure, can refer to a surface roughness of radial striae Rz of less than 10 µm, particularly less than 8 µm, more particularly 6.3 µm or less. Flat, in the context of this disclosure, can be understood as not comprising any grooves or ridges along the contact surface of the hollow-metal gasket 152 or the spacer 150.

In the embodiment shown in FIG. 1, the flange members 110, 112 each comprise an opening 130, 132, such as a through-hole. The opening can be a central opening. According to embodiments, the opening can be circular, however, other shapes are possible. Each flange member can be configured for the attachment of a component to the flange member, such as a pipe, a crucible, a reservoir, a nozzle, a diffuser, a showerhead and/or a wall portion of a processing chamber. The component can be attached to the flange member e.g. via welding the pipe to the flange member. The component can include a volume for transporting a material, e.g. lithium, through the volume. When the flange member is connected to the component, the material can pass from the volume through the opening of the flange member. The opening can extend in a substantially axial direction, i.e. a direction that is orthogonal to the sealing surface of the flange member. The opening 130 of the flange member 110 can be in fluid connection with the opening 132 of the flange member 112. The openings 130, 132 can be part of the interior volume when the flange is sealed, such that a conveyed material or substance can pass the flanged joint through the openings 130, 132.

In the embodiment shown in FIG. 1, the flanged joint 100 has a hollow-metal gasket 152 provided between the flange members 110, 112. The hollow-metal gasket 152 can have a shape corresponding to the shape of the flange 100, more particularly corresponding to the shape of the flange members 110, 112 and/or the shape of the openings 130, 132. According to embodiments, the openings 130, 132 can be circular holes, the flange members 110, 112 can be circular discs and the hollow-metal gasket 152 can be a circular hollow-metal gasket. The openings 130, 132, the flange members 110, 112 and the hollow-metal gasket 152 can be arranged coaxially. In addition to a shape, the hollow-metal gasket 152 can further be described according to the hollow-metal gasket's cross-sectional profile.

According to embodiments, which can be combined with other embodiments described herein, the cross-sectional profile of the hollow-metal gasket can be circular, i.e. the hollow-metal gasket 152 can be a hollow-metal O-ring, however, different cross-sectional shapes are possible. The hollow-metal gasket 152 may be compressed by a pressing action of the first flange member 110 and the second flange member 112 when the joint is sealed. The hollow-metal gasket 152 may consequently be deformed to a certain degree, as will be discussed in further detail below. The hollow metal gasket 152 is provided between the first flange member 110 and the second flange member 112 such that a joint is formed between the first flange member and the second flange member, and a seal is formed between the interior volume 140 and the exterior volume 142. In light thereof, a conveyed substance 160, which may comprise an alkali metal, such as lithium or lithium vapor, can be sealed within the interior volume.

In the embodiment shown in FIG. 1, the flanged joint 100 has a spacer 150 provided between the flange members 110, 112. The spacer 150 can be provided radially outside of the hollow-metal gasket 152, i.e. on the side of the exterior volume 142 relative to the hollow-metal gasket 152. The spacer can have a shape corresponding to the shape of the hollow-metal gasket, e.g. both the hollow-metal gasket and the spacer can be circular, with the spacer having a larger diameter than the hollow-metal gasket. The flange members 110, 112, the openings 130, 132, the hollow-metal gasket 152 and the spacer 150 can be arranged coaxially, the axial direction being the direction orthogonal to the sealing surfaces 120, 122. The spacer can be a spacer ring or a shim ring. The spacer can be a retainer. The spacer can be substantially flat in relation to the sealing surfaces 120, 122, such that the spacer evenly contacts the sealing surfaces 120, 122. The spacer can be arranged substantially adjacent to the hollow-metal gasket. The spacer can be in contact with the hollow-metal gasket in a radial direction, particularly across some or most of the circumference of the hollow-metal gasket, more particularly across all of the circumference of the hollow-metal gasket. The interior spacer surface 151 can extend substantially straight along the axial direction, such that, if the spacer has a circular shape, the interior surface is cylindrical. The interior spacer surface 151 can form a barrier for the expansion of the hollow-metal gasket 152. In operation, the hollow-metal gasket can be pressed against the spacer in a radial direction. The spacer can have a dimension along the axial direction, i.e. a height, which is smaller than the dimension of the uncompressed hollow-metal gasket along the axial direction.

According to embodiments, which can be combined with other embodiments described herein, the flanged joint 100 is brought into a sealed state by assembling the components of the joint as herein described in relation to FIG. 1, and providing a force along the axial direction between the first flange member 110 and the second flange member 112. The force is chosen such that the force will push the flange members 110, 112 towards each other. The hollow-metal gasket 152 is compressed until the flange members 110, 112 come into contact with the spacer 150.

Consequently, the spacer defines the minimum distance between the first flange member 110 and the second flange member 112. The hollow-metal gasket 152 is compressed according to the difference in dimensions along the axial direction of the hollow metal gasket 152 and the spacer 150. The difference in dimensions along the axial direction of the hollow-metal gasket 152 and the spacer 150 can be such that the hollow-metal gasket 152 is compressed by less than 0.2 mm, particularly less than 0.15 mm, more particularly 0.1 mm or less. The difference in dimension along the axial direction of the hollow-metal gasket 152 and the spacer 150 can be such that the compression of the hollow-metal gasket 152 is in the range of 10% to 30% of the diameter of the cross-sectional profile of the hollow-metal gasket 152, particularly 15% to 25% of the diameter of the cross-sectional profile, or about 20% of the cross-sectional profile. According to embodiments, which can be combined with other embodiments described herein, the compression of the hollow-metal gasket 152 can occur along substantially the complete area of the hollow-metal gasket 152, preferably such that the hollow-metal gasket is compressed substantially evenly across the circumference of the hollow-metal gasket. An even compression can be beneficial, since an even compression can result in an even force distribution across the flanged joint, which can make the flanged joint more resistant to mechanical stress or motion due to, e.g., thermal expansion caused by high temperature, or temperature variations, particularly repeated temperature variations. A high tolerance to thermal and/or mechanical effects such as those described above can beneficially increase the operating range of the flanged joint.

As is shown in FIG. 1, the compression of the hollow-metal gasket 152 can lead to a deformation of the hollow-metal gasket 152, resulting in a strong seal between the hollow metal gasket 152 and the flange members 110, 112. According to embodiments, which can be combined with other embodiments described herein, the compression of the hollow-metal gasket leads to an elastic deformation of the hollow-metal gasket, such that a force, e.g. a permanent force, particularly a spring-force or a spring-like force, acts on the seal between the sealing surfaces 120, 122 and the hollow-metal gasket 152. In an embodiment, which can be combined with other embodiments described herein, the compression of the hollow-metal gasket 152 increases the contact area of the seal between the sealing surfaces 120, 122 and the hollow-metal gasket 152.

As shown in FIG. 1, according to embodiments, the hollow-metal gasket can be stabilized against radial displacement by the spacer 150, the interior surface 151 forming a radial barrier.

According to embodiments, which can be combined with other embodiments described herein, the spacer comprises a metal that has low reactivity with lithium. Possible metals and alloys include, but are not limited to, tantalum, molybdenum and/or nickel/chrome alloys such as Inconel® X750. In yet another beneficial embodiment, the spacer can provide additional sealing, e.g. the spacer can function as a secondary seal if the hollow-metal gasket should break during operation. In an embodiment, which can be combined with other embodiments described herein, the sealing action of the spacer is sufficient if, after a break of the hollow-metal gasket, a leak, e.g. the unwanted flow of lithium, is substantially reduced compared to an open leak. The function of the spacer as a secondary seal can allow a processing apparatus to be shut down and cooled in a controlled fashion, even when a leak occurs.

According to embodiments, which can be combined with other embodiments described herein, the hollow-metal gasket comprises a metal that has low reactivity with lithium. Possible metals and alloys include, but are not limited to, tantalum, molybdenum and/or nickel/chrome alloys such as Inconel® X750.

According to embodiments, which can be combined with other embodiments described herein, each flange member comprises a metal that has low reactivity with lithium. In another beneficial embodiment, the flange members comprise a metal that can be easily reworked, e.g. during maintenance or refurbishment of the flanged joint. Possible metals or metal alloys include, but are not limited to, stainless steel, particularly high corrosion resistant stainless steel, such as 1.4404 (X2CrNiMo17-12-2).

According to embodiments, which can be combined with other embodiments described herein, the choice of suitable materials for the flange members, the hollow-metal gasket and the spacer, particularly the materials described above, can make the use of additional surface coating unnecessary for some or all of the described components.

In yet another embodiment, which can be combined with other embodiments described herein, the hollow-metal gasket comprises a surface coating, such as a coating comprising gold, silver, nickel or copper. The coating, which can be soft compared to the hollow-metal gasket and/or the flange members, can improve the seal by filling surface imperfections in the sealing surfaces 120, 122 after the hollow-metal gasket 152 has been compressed. In an embodiment, a coating with an inert metal can improve the chemical resistance of the hollow-metal gasket to lithium.

According to embodiments, which can be combined with other embodiments described herein, the hollow-metal gasket includes, in the hollow portion of the hollow-metal gasket, a gas, particularly an inert gas, more particularly argon. The gas can be sealed within the hollow-metal gasket. When the temperature increases, the pressure within the hollow-metal gasket increases according to the ideal gas law. An increase in pressure within the hollow-metal gasket can, at high temperatures, increase the compression forces of the seal and improve the sealing. While the benefits of a hollow-metal gasket with a sealed inert gas within the hollow portion of the hollow-metal gasket have been described, hollow-metal gaskets with pressure balancing holes can be equally suitable in providing said function.

In an embodiment, which can be combined with other embodiments described herein, the hollow-metal gasket has a wall with a thickness. The thickness can be substantially uniform. The mechanical properties of the gasket, particularly the force acting on the seal due to the defined compression and the temperature of the hollow-metal gasket, can be dependent on the following parameters: material, dimension, profile, wall thickness, gas pressure; or any combination thereof.

In an embodiment, which can be combined with other embodiments described herein, the parameters of the hollow-metal gasket and the spacer are chosen such that the flanged joint provides a tight seal in a temperature range between 15° C. and 950° C., particularly between 20° C. and 700° C. In embodiments, the flanged joint can be operated continuously at a temperature of about 600° C., and the parameters of the hollow-metal gasket and the spacer are chosen to be particularly suitable for this temperature. In an embodiment, the joined flange can be assembled at room temperature, and subsequently operated at a higher operating temperature.

In an embodiment, which can be combined with other embodiments described herein, the parameters of the hollow-metal gasket and the spacer are chosen such that the flanged joint provides a tight seal in an exterior pressure range between 0 bar and 1 bar. In embodiments, the flanged joint can be operated continuously at an exterior pressure of about $10^{-3}$ mbar, and the parameters of the hollow-metal gasket and the spacer can be chosen to be particularly suitable for this pressure range.

In an embodiment, which can be combined with other embodiments described herein, the parameters of the hollow-metal gasket and the spacer are chosen such that the flanged joint provides a tight seal when liquid or gaseous metal, such as an alkali metal, particularly lithium, is held within or conveyed through the flange. In embodiments, which can be combined with other embodiments described herein, the flanged joint can be operated continuously when the difference in interior pressure, in relation to the exterior pressure, is 500 mbar or less, particularly, 250 mbar or less, more particularly about 200 mbar. The difference between the interior pressure and the exterior pressure can be a result of the hydrostatic pressure and/or the active conveyance of the liquid or gaseous metal. The interior pressure can be higher than the exterior pressure, or the interior pressure can be lower than the exterior pressure. The conveyance can be performed according to a predefined direction 160, as shown in FIG. 1 or FIG. 2.

According to embodiments, which can be combined with other embodiments described herein, the parameters of the hollow-metal gasket and the spacer are chosen such that the flanged joint provides a tight seal under many or all of the conditions outlined above, particularly temperature, exterior pressure, and/or pressure difference. According to embodiments, the flanged joint provides a tight seal for a number of cycles between normal conditions (room temperature, ambient pressure) and the operating conditions outlined above.

Figure 2:
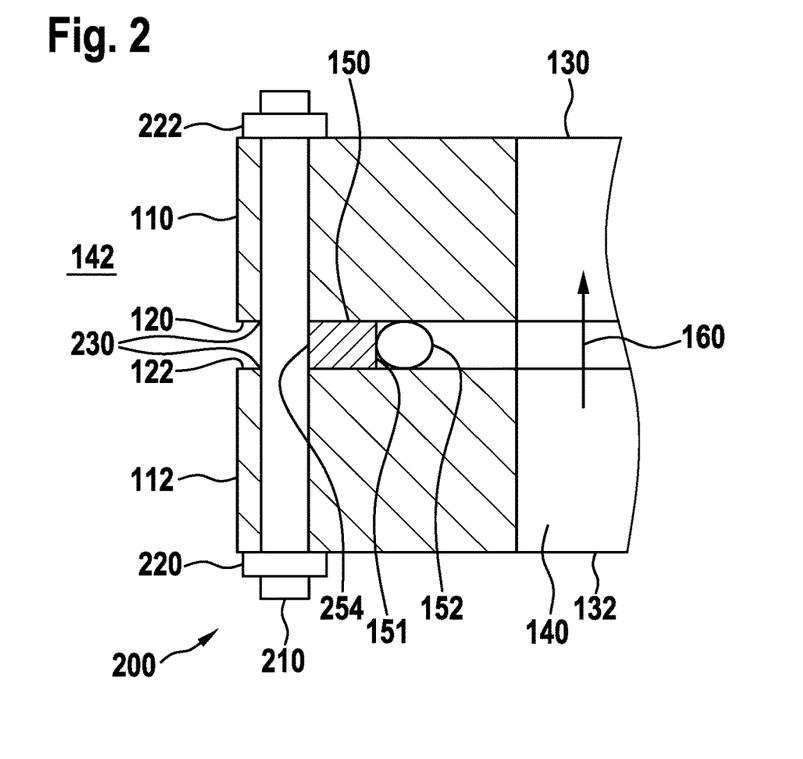
FIG. 2 shows a schematic cross-section of a flanged joint according to embodiments of the present disclosure.

Referring to FIG. 2, an embodiment of the flanged joint 200 is shown. Only the differences to the flanged joint shown in FIG. 1 shall be discussed. In the embodiment of FIG. 2, the force between the first flange member 110 and the second flange member 112 is provided by a plurality of fasteners, e.g. bolts 210. The bolts 210 are provided within openings 230 and fastened with nuts 220, 222. The nuts 220, 222 can be torqued according to a specified torque range to provide an even force across the whole flange. As can be seen in FIG. 2, once the nuts 220, 222 are torqued, the first sealing surface 120 and the second sealing surface 122 press against the spacer 150, such that even further torqueing of the nuts does not result in additional motion of the flange members 110, 112 towards each other. Thus, the spacer defines a minimum distance between the first flange member 110 and the second flange member 112. The minimum distance between the first flange member 110 and the second flange member can result in a maximum compression of the hollow-metal gasket 152, which can be independent from the torque of the fasteners 210 once the fasteners are torqued to the point where the flange members 110, 120 contact the spacer 150.

In an embodiment, which can be combined with other embodiments described herein, the exterior spacer surface 254, like the interior spacer surface 151, can extend substantially straight along the axial direction. If the spacer has a circular shape, the exterior spacer surface is cylindrical. As shown in FIG. 2, this surface can form a border between the spacer and the plurality of fasteners 210, such that the spacer 150 is firmly seated within the flanged joint, and that the position of the spacer is defined. The spacer can function as a retainer, particularly a retainer ring, for the hollow-metal gasket.

In an embodiment, which can be combined with other embodiments described herein, the spacer 150, particularly the exterior spacer surface 254, can be shaped for further interaction with the fasteners 210. The spacer can have cutouts or openings, e.g. holes, that correspond to the plurality of fasteners 210 within the flange, such that the spacer is seated even more firmly within the flanged joint.

In the embodiment of FIG. 2, only one fastener 210 is shown, however, according to the dimensions of the flanged joint, a higher number of fasteners may be provided, which preferably can be arranged in a rotationally symmetrical fashion, such as two opposite fasteners, or a plurality of evenly spaced fasteners.

In an embodiment, which can be combined with other embodiments described herein, the force between the first flange member 110 and the second flange member 112 can be provided by a V-Band clamp. Other options for providing the force can be equally suitable.

Figure 3:
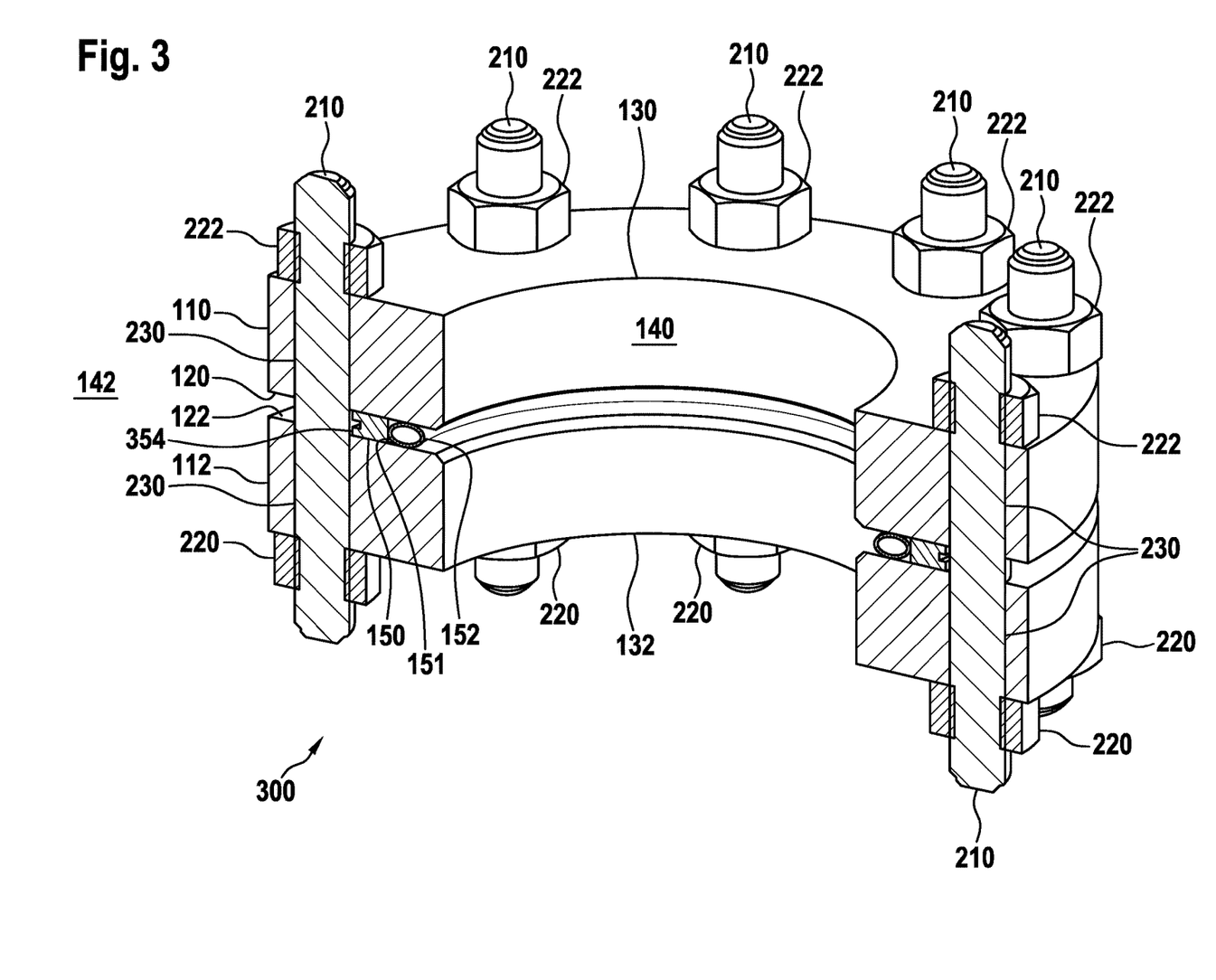
FIG. 3 shows a schematic cutaway view of a flanged joint according to embodiments of the present disclosure.

Referring to FIG. 3, an embodiment of the flanged joint 300 is shown. Only the differences to the flanged joint shown in FIG. 1 and/or FIG. 2 shall be discussed. FIG. 3 shows a three-dimensional cross-section of a circular flanged joint, hence, the plurality of fasteners, e.g. bolts 210 and nuts 220, 222 lying outside of the sectional plane can be seen. In the embodiment shown in FIG. 3, the flanged joint 300 has ten evenly spaced bolts 210 provided in openings 230, six of which are shown. Depending on the dimensions of the flanged joint, a smaller or higher number of bolts can be beneficial.

In the embodiment of FIG. 3, the hollow-metal gasket 152 is a circular hollow-metal O-ring with a wall thickness that is about 15% of the cross-sectional diameter of the hollow-metal O-ring. Depending on the size of the flange, the wall thickness of the hollow-metal O-ring can be in the range of 10% up to 20% of the cross-sectional diameter.

In the embodiment of FIG. 3, the spacer 150 is, like the hollow-metal O-ring, circular. Further to providing a defined spacing in the axial direction, the spacer 150 functions as a retainer ring, which prevents the hollow-metal gasket from moving in the radial direction. The spacer is held in place by the plurality of fasteners 210.

Figure 4:
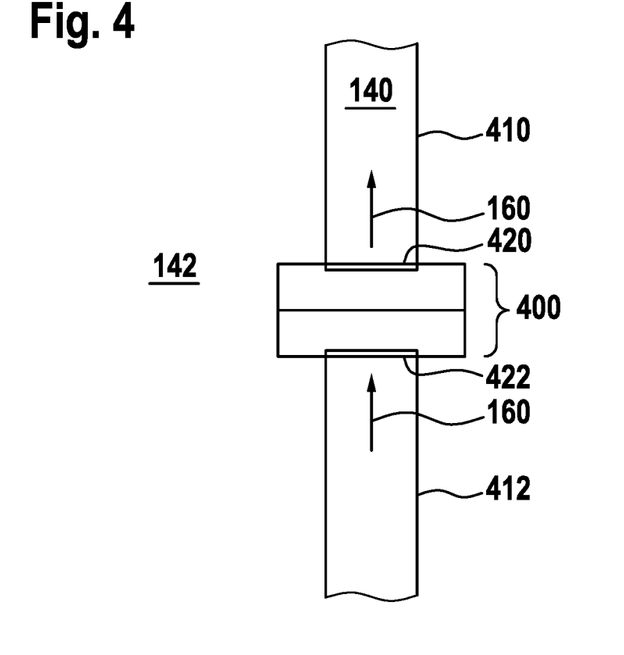
FIG. 4 shows a schematic view of two components being connected by a flanged joint according to embodiments of the present disclosure.

In the embodiment of FIG. 3, a groove 354 is present in the exterior spacer surface 254. This groove can be utilized for applying tools for facilitating the removal of the spacer during maintenance without damaging the sealing surfaces 120, 122. Referring to FIG. 4, an embodiment of the flanged joint 400 is shown in an exemplary configuration. The flanged joint 400 shown in FIG. 4 can be any flanged joint according to an embodiment described herein, e.g. a flanged joint 100, 200, 300. The joint 400 is used to fluidly connect a first component 410 and a second component 412. In the example of FIG. 4, the first component 410 is a first pipe and the second component is a second pipe 412. In an embodiment, which can be combined with other embodiments described herein, the first component 410 and/or the second component 412 can be a component of a lithium-deposition apparatus, e.g. a crucible, a reservoir, a nozzle, a diffuser, a showerhead, and/or a wall portion of a processing chamber.

In the embodiment of FIG. 4, the flanged joint 400 seals off the interior volume 140, which is formed by the first component 410, the second component 412 and the flanged joint 400, from the exterior volume 142. The interior volume can be a metal-conveying volume, particularly an alkali metal or alkaline earth metal conveying volume, more particularly a lithium-conveying volume. The metal conveyed in the metal-conveying volume can be liquid or gaseous.

In the embodiment of FIG. 4, the components 410, 412 are connected to the flanged joint 400 via connections 420, 422. The connections 420, 422 provide a mechanical connection between the components 410, 412 and the flanged joint 400. The connections can be welds, e.g. welds that are impervious to the conveyed material or substance.

In the embodiment of FIG. 4, the conveyance within the interior volume 140 is symbolized as arrows 160. The conveyance can be constant or intermittent. The conveyance can have a single direction, or the direction of the conveyance can be reversed. Under certain conditions, e.g. during maintenance, the conveyance can be stopped, and the interior volume can be emptied, e.g. filled with a vacuum or a gas.

Figure 5:
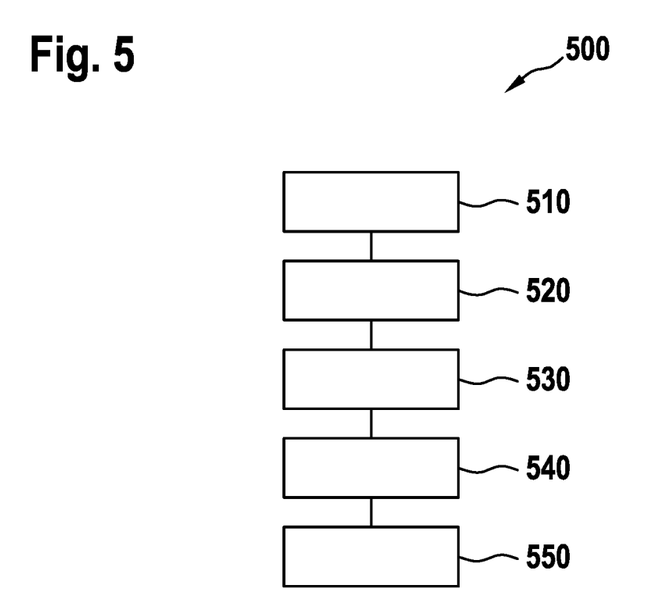
FIG. 5 shows a flow chart of a method of fluidly connecting a first component to a second component according to embodiments of the present disclosure.

Referring to FIG. 5, a method 500 of fluidly connecting a first component to a second component is provided. For performing the method, a first flange member and a second flange member are provided. The flange members can be flange members according to an embodiment described herein, particularly the flange members 110, 112. The flange members have a sealing surface.

The method comprises connecting the first flange member to the first component at operation 510, and connecting the second flange member to the second component at operation 520. The connection can be formed such that the components are fluidly sealed to the flange members. The connection can be, e.g. a weld or a clamp. The connection can provide a mechanical support between the components and the flange members.

The method further comprises, at operation 530, arranging a hollow-metal gasket between the first flange member and the second flange member. The method further comprises, at operation 540, arranging a spacer between the first flange member and the second flange member. The hollow-metal gasket can be a gasket according to an embodiment described herein, particularly the hollow-metal gasket 152. The spacer can be a spacer according to an embodiment described herein, particularly the spacer 150. The hollow-metal gasket and the spacer can be arranged such that the hollow-metal gasket is positioned towards an interior volume of the joint, and that the spacer is positioned towards an exterior volume of the joint.

At operation 550, the first flange member is connected to the second flange member. According to the method, the hollow-metal gasket forms a seal between a first sealing surface of the first flange member and a second sealing surface of the second flange member. According to the method, the spacer defines a minimum distance between the first flange member and the second flange member.

In an embodiment, which can be combined with other embodiments described herein, the method of fluidly connecting a first component to a second component further comprises conveying lithium from the first component to the second component, particularly within the fluidly connected volumes. The fluidly connected volumes can be an interior volume, sealed against an exterior volume by the connection formed according to methods of embodiments of the present disclosure. According to embodiments, the provided components, particularly the flange members and the hollow-metal gasket, are resistant to the chemical, mechanical and thermal stresses involved with conveying lithium, particularly liquid lithium or lithium vapor.

In an embodiment, which can be combined with other embodiments described herein, the method of fluidly connecting a first component to a second component further comprises pressing the first flange member and the second flange member towards each other, such as pressing the first flange member to the second flange member. The pressing force can be provided by a series of fasteners. According to an embodiment, the pressing force effects an elastic deformation of the hollow-metal gasket. The elastic deformation can seal the hollow-metal gasket between the first flange member and the second flange member. According to embodiments, the distance of compression of the hollow-metal gasket is 0.2 mm or less, particularly 0.15 mm or less, more particularly 0.1 mm or less. The distance of compression of the hollow-metal gasket can be limited by the action of the spacer.

According to an aspect, the use of a hollow-metal gasket for sealing a flanged joint in a lithium-processing apparatus is described. The lithium processing system can comprise a reservoir of liquid lithium which is fluidly connected to a series of pipes, such that the lithium is conveyed through the series of pipes. The series of pipes can comprise one or more flanged joints according to an embodiment of this disclosure. The liquid lithium can further be conveyed into a crucible and flash evaporated within the crucible. The crucible can be connected to a processing chamber with a flanged joint according to an embodiment of this disclosure. The processing system can comprise a processing chamber in which gaseous lithium is processed. The processing chamber and/or components of the processing chamber, such as a vacuum- or process gas inlet, can be connected to the processing chamber with a flanged joint according to an embodiment of this disclosure.

The flanged joint according to an embodiment described in the present disclosure, the method of fluidly connecting a first component to a second component and the use of a hollow-metal gasket for sealing a flanged joint in a lithium-processing apparatus can have the technical advantage that, since the sealing surfaces are formed by two flat flange members with a hollow-metal gasket in between, the overall compression of the seal is controlled by the spacer, in particular the axial dimensions of the spacer, such as the height of the spacer. Thus, well-defined, limited and evenly distributed compression forces can be achieved for the seal area, even when the total compression forces between the flange members are high or uneven. This allows the seal to be functional over a high temperature range, since the initial, low compression is elastic in nature and can therefore compensate, possibly in combination with an increase in gas pressure within the hollow-metal gasket, any thermal expansion of the flanged joint.

During maintenance, cleaning or repair, the flange members can be easily refurbished if the worked surfaces are flat, i.e. no grooves or other recesses need to be restored.

Solidified lithium can easily be removed, e.g. washed or scraped off the flat surface. This can improve the overall safety when working the joint. Furthermore, the flange members can be identical, allowing standardized tooling. The hollow-metal gasket and the spacer, which often are low-cost replacement parts, can be replaced at low cost. Easy, safe and cost-effective repair can therefore be achieved, which can be beneficial, since, even when chemically stable materials are used, the high reactivity of lithium can make it necessary to repair or maintain the flanged joint at comparatively high intervals.

While the foregoing is directed to embodiments, other and further embodiments may be devised without departing from the basic scope, and the scope is determined by the claims that follow.

The invention claimed is:

1. A flanged joint, comprising:
    a first flange member having a first flat sealing surface, the first flat sealing surface extending from a radial inward edge of the first flange member to a radially outermost edge of the first flange member;
    a second flange member having a second flat sealing surface, the second flat sealing surface extending from a radial inward edge of the second flange member to a radially outermost edge of the second flange member;
    a hollow-metal gasket between the first flange member and the second flange member, wherein the hollow metal gasket includes a material that is chemically resistant to an alkali-metal and an inert metal coating; and wherein the hollow-metal gasket is a hollow metal O-ring; and
    a spacer between the first flat sealing surface of the first flange member and the second flat sealing surface of the second flange member, the spacer defining a minimum distance between the first flange member and the second flange member, wherein:
    the first flange member includes a first plurality of fastener openings, the second flange member includes a second plurality of fastener openings, wherein each fastener opening of the first plurality of fastener openings faces a fastener opening of the second plurality of fastener openings,
    the flange joint comprises a plurality of fasteners for pressing the first flange member and the second flange member towards each other, wherein each fastener is disposed in a fastener opening of the first plurality of fastener openings and in a fastener opening of the second plurality of fastener openings, and
    the plurality of fasteners are in contact with an exterior surface of the spacer.

2. The flanged joint according to claim 1, wherein the flanged joint is configured to seal a metal-conveying volume.

3. The flanged joint according to claim 2, wherein the metal-conveying volume is configured to receive fluid lithium or gaseous lithium.

4. The flanged joint according to claim 3, wherein the metal-conveying volume is an interior volume, the interior volume being sealed off from an exterior volume, wherein the flanged joint is configured to withstand a pressure difference between the interior volume and the exterior volume of up to 200 mbar.

5. The flanged joint according to claim 1, wherein the spacer includes a material that is chemically resistant to an alkali-metal.

6. The flanged joint according to claim 1, wherein the hollow-metal gasket forms a seal between the first sealing surface and the second sealing surface.

7. The flanged joint according to claim 1, wherein the hollow-metal gasket includes an inert gas.

8. The flanged joint according to claim 1, wherein the hollow-metal gasket and/or the spacer comprises at least one of a nickel/chromium alloy, tantalum and molybdenum.

9. The flanged joint according to claim 1, wherein the inert metal coating includes gold, silver, nickel or copper.

10. The flanged joint according to claim 1, wherein the flanged joint is operable in a temperature range from 15° C. to 950° C.

11. A method of fluidly connecting a first component to a second component, the method comprising:
    connecting a first flange member having a first flat sealing surface to the first component, the first flat sealing surface extending from a radial inward edge of the first flange member to a radially outermost edge of the first flange member;
    connecting a second flange member having a second flat sealing surface to the second component, the second flat sealing surface extending from a radial inward edge of the second flange member to a radially outermost edge of the second flange member;
    arranging a hollow-metal gasket between the first flange member and the second flange member, wherein the hollow metal gasket includes a material that is chemically resistant to an alkali-metal and an inert metal coating;
    arranging a spacer between the first flat sealing surface of the first flange member and the second flat sealing surface of the second flange member; and connecting the first flange member to the second flange member, wherein
        the hollow-metal gasket forms a seal between the first sealing surface and the second sealing surface, and wherein
    the spacer defines a minimum distance between the first flange member and the second flange member, wherein:
    the first flange member includes a first plurality of fastener openings, the second flange member includes a second plurality of fastener openings, wherein each fastener opening of the first plurality of fastener openings faces a fastener opening of the second plurality of fastener openings,
    the flange joint comprises a plurality of fasteners for pressing the first flange member and the second flange member towards each other, wherein each fastener is disposed in a fastener opening of the first plurality of fastener openings and in a fastener opening of the second plurality of fastener openings, and
    the plurality of fasteners are in contact with an exterior surface of the spacer.

12. The method according to claim 11, the method further comprising:
    conveying one of the group consisting of liquid metal, gaseous metal, liquid alkali metal, gaseous alkali metal, liquid alkaline earth metal, gaseous alkaline earth metal, liquid lithium, and gaseous lithium from the first component to the second component.

13. The method according to claim 11, the method further comprising:
    pressing the first flange member and the second flange member towards each other.

14. The method according to claim 13, wherein a pressing force is provided by the plurality of fasteners connecting the first flange member to the second flange member.

15. The method according to claim 11, wherein the hollow-metal gasket is compressed to provide an elastic deformation of the hollow metal gasket.

16. The method according to claim 15, wherein the hollow-metal gasket is compressed between the first flange member and the second flange member,
   and wherein the difference in diameter of the uncompressed hollow-metal gasket and the compressed hollow-metal gasket in the direction of the compressing force is 0.2 mm or less.

17. The method according to claim 11, wherein the first component and/or the second component is a pipe, a crucible, a reservoir, a nozzle, a diffuser, a showerhead and/or a wall portion of a processing chamber.

* * * * *